US006647347B1

(12) United States Patent
Roushall et al.

(10) Patent No.: US 6,647,347 B1
(45) Date of Patent: Nov. 11, 2003

(54) PHASE-SHIFTED DATA ACQUISITION SYSTEM AND METHOD

(75) Inventors: Randy K. Roushall, Redwood City, CA (US); Robert K. Crawford, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 681 days.

(21) Appl. No.: 09/625,909

(22) Filed: Jul. 26, 2000

(51) Int. Cl.[7] ............................ G06F 19/00; G01T 3/00
(52) U.S. Cl. ..................................... 702/75; 250/390.08
(58) Field of Search .............................. 702/75, 28, 23, 702/27, 89; 250/339.07, 339.09, 390.08; 73/23.36, 23.37

(56) References Cited

U.S. PATENT DOCUMENTS

| | | | | | |
|---|---|---|---|---|---|
| 5,367,162 | A | | 11/1994 | Holland et al. | |
| 5,396,065 | A | | 3/1995 | Myerholtz et al. | |
| 5,619,034 | A | * | 4/1997 | Reed et al. | 250/287 |
| 5,712,480 | A | | 1/1998 | Mason | |
| 5,867,125 | A | * | 2/1999 | Cluff et al. | 342/442 |
| 5,981,946 | A | | 11/1999 | Mason | |
| 6,300,626 | B1 | * | 10/2001 | Brock et al. | 250/287 |
| 6,455,845 | B1 | * | 9/2002 | Li et al. | 250/287 |

FOREIGN PATENT DOCUMENTS

| | | |
|---|---|---|
| WO | WO 99/67801 | 12/1999 |

* cited by examiner

*Primary Examiner*—Patrick Assouad
(74) *Attorney, Agent, or Firm*—Marc R. Mayer

(57) ABSTRACT

Improved data acquisition systems and methods that enable large numbers of data samples to be accumulated rapidly with low noise are described. In accordance with this inventive approach, a plurality of data samples is produced from a transient sequence in response to sampling clock, and corresponding data samples across the transient sequence are accumulated in response to an accumulation clock that is shifted in phase relative to the sampling clock.

20 Claims, 4 Drawing Sheets

PHASE-SHIFTED DATA ACQUISITION SYSTEM AND METHOD

CROSS-REFERENCE TO RELATED APPLICATIONS

This application is related to U.S. application Ser. No. 09/625,916, filed on even date herewith, by Randy K. Roushall and Robert K. Crawford, and entitled "Multipath Data Acquisition System and Method," which is incorporated herein by reference.

TECHNICAL FIELD

This invention relates to data acquisition systems and methods.

BACKGROUND

Data acquisition systems and methods may be used in a variety of applications. For example, data acquisition techniques may be used in nuclear magnetic resonance imaging systems and Fourier transform spectrometer systems. Such techniques also may be used in mass spectrometer systems, which may be configured to determine the concentrations of various molecules in a sample. A mass spectrometer operates by ionizing electrically neutral molecules in the sample and directing the ionized molecules toward an ion detector. In response to applied electric and magnetic fields, the ionized molecules become spatially separated along the flight path to the ion detector in accordance with their mass-to-charge ratios.

Mass spectrometers may employ a variety of techniques to distinguish ions based on their mass-to-charge ratios. For example, magnetic sector mass spectrometers separate ions of equal energy based on their momentum changes in a magnetic field. Quadrupole mass spectrometers separate ions based on their paths in a high frequency electromagnetic field. Ion cyclotrons and ion trap mass spectrometers distinguish ions based on the frequencies of their resonant motions or stabilities of their paths in alternating voltage fields. Time-of-flight (or "TOF") mass spectrometers discriminate ions based on the velocities of ions of equal energy as they travel over a fixed distance to a detector.

In a time-of-flight mass spectrometer, neutral molecules of a sample are ionized, and a packet (or bundle) of ions is synchronously extracted with a short voltage pulse. The ions within the ion source extraction are accelerated to a constant energy and then are directed along a field-free region of the spectrometer. As the ions drift down the field-free region, they separate from one another based on their respective velocities. In response to each ion packet received, the detector produces a data signal (or transient) from which the quantities and mass-to-charge ratios of ions contained in the ion packet may be determined. In particular, the times of flight between extraction and detection may be used to determine the mass-to-charge ratios of the detected ions, and the magnitudes of the peaks in each transient may be used to determine the number of ions of each mass-to-charge in the transient.

A data acquisition system (e.g., an integrating transient recorder) may be used to capture information about each ion source extraction. In one such system, successive transients are sampled and the samples are summed to produce a summation, which may be transformed directly into an ion intensity versus mass-to-charge ratio plot, which is commonly referred to as a spectrum. Typically, ion packets travel through a time-of-flight spectrometer in a short time (e.g., 100 microseconds) and ten thousand or more spectra may be summed to achieve a spectrum with a desired signal-to-noise ratio and a desired dynamic range. Consequently, desirable time-of-flight mass spectrometer systems include data acquisition systems that operate at a high processing frequency and have a high dynamic range.

In one data acquisition method, which has been used in high-speed digital-to-analog converters, data is accumulated in two or more parallel processing channels (or paths) to achieve a high processing frequency (e.g., greater than 100 MHz). In accordance with this method, successive samples of a waveform (or transient) are directed sequentially to each of a set of two or more processing channels. The operating frequency of the components of each processing channel may be reduced from the sampling frequency by a factor of N, where N is the number of processing channels. The processing results may be stored or combined into a sequential data stream at the original sampling rate.

SUMMARY

When applied to applications in which sample sets (or transients) are accumulated to build up a composite signal (e.g., TOF mass spectrometer applications), the process of accumulating samples in parallel processing channels may introduce noise artifacts that are not reduced by summing the samples from each processing channel. In particular, although contributions from random noise and shot noise may be reduced by increasing the number of transients summed, each processing channel may contribute to the composite signal a non-random pattern noise that increases with the number of transients summed. Such pattern noise may result from minute differences in digital noise signatures induced in the system by the different parallel processing paths. For example, the physical separations between the components (e.g., discrete memory, adders and control logic) of a multi-path or parallel-channel data acquisition system may generate voltage and current transitions within the board or chip on which the data acquisition system is implemented. The unique arrangement of each processing path may induce a unique digital noise signature (or pattern noise) in the analog portion of the system. The resulting digital noise signature increases as the composite signal is accumulated, limiting the ability to resolve low-level transient signals in the composite signal.

The invention features improved data acquisition systems and methods that substantially reduce accumulated pattern noise to enable large numbers of data samples to be accumulated rapidly with low noise and high resolution.

In one aspect of the invention, a data acquisition system includes a sampler and an accumulator. The sampler is configured to produce a plurality of data samples from a transient sequence in response to a sampling clock. The accumulator is coupled to the sampler and is configured to accumulate data samples in response to an accumulation clock that is shifted in phase relative to the sampling clock.

Embodiments may include one or more of the following features.

The accumulator preferably is configured to accumulate corresponding data samples across the transient sequence (i.e., data samples from different transients having similar mass-to-charge ratios are summed together to produce a spectrum).

The accumulation clock may be shifted between 90° and 270° relative to the sampling clock, and preferably is shifted approximately 180° relative to the sampling clock. The data acquisition system may include a multiphase frequency synthesizer that is configured to generate the sampling clock and the accumulation clock.

In one embodiment, the accumulator comprises two or more parallel accumulation paths and accumulates corresponding data samples across the transient sequence through different accumulation paths. Each accumulation path preferably accumulates data samples in response to a respective accumulation clock. The phase of the accumulation clock for each accumulation path may be shifted relative to the sampling clock by a respective amount. A controller preferably is coupled to the accumulator and is configured to cycle the accumulation of data samples through each of the accumulation paths.

In another aspect, the invention features a time-of-flight mass spectrometer that includes an ion detector, a sampler, and an accumulator. The ion detector is configured to produce a transient sequence from a plurality of respective ion packets. The sampler is configured to produce a plurality of data samples from the transient sequence in response to a sampling clock. The accumulator is coupled to the sampler and is configured to accumulate corresponding data samples across the transient sequence in response to an accumulation clock that is shifted in phase relative to the sampling clock.

In another aspect, the invention features a method of acquiring data. In accordance with this inventive method, a plurality of data samples is produced from a transient sequence in response to sampling clock, and corresponding data samples across the transient sequence are accumulated in response to an accumulation clock that is shifted in phase relative to the sampling clock.

The phase of the accumulation clock preferably is shifted relative to the sampling clock by an amount selected to reduce noise in an accumulator output signal. Corresponding data samples preferably are accumulated across the transient sequence through two or more parallel accumulation paths. Data samples preferably are accumulated through each accumulation path in response to a respective accumulation clock. The phase of each accumulation path clock preferably is shifted to reduce noise in the accumulated data samples. The accumulation of data samples preferably is cycled through each of the parallel accumulation paths.

Among the advantages of the invention are the following.

By shifting the accumulation clock relative to the sampling clock, the overall noise level induced in the spectrum data by the accumulator may be reduced. This feature improves the signal-to-noise ratio in the resulting spectrum and, ultimately, improves the sensitivity of the data acquisition system.

Other features and advantages of the invention will become apparent from the following description, including the drawings and the claims.

DETAILED DESCRIPTION

Figure 1:
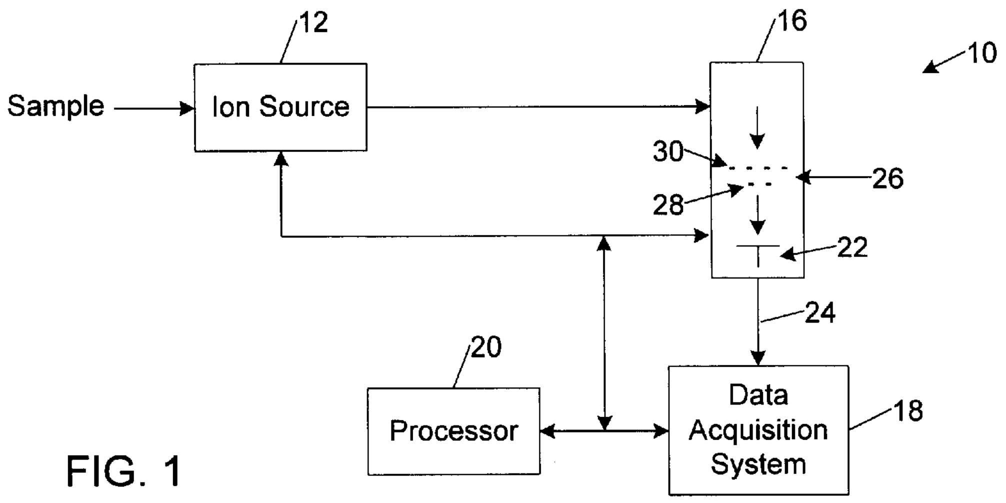
FIG. 1 is a block diagram of a time-of-flight mass spectrometer, including a flight tube and a data acquisition system.

Referring to FIG. 1, a time-of-flight mass spectrometer 10 includes an ion source 12, a flight tube 16, a data acquisition system 18, and a processor 20 (e.g., a computer system). Time-of-flight mass spectrometer 10 may be arranged in an orthogonal configuration or on-axis configuration. Ion source 12 may generate ions using any one of a variety of mechanisms, including electron impact, chemical ionization, atmospheric pressure ionization, glow discharge and plasma processes. Flight tube 16 includes an ion detector 22 (e.g., an electron multiplier), which is configured to produce a sequence of transients 24 containing a series of pulses from which the quantities and mass-to-charge ratios of the ions within each transient may be determined. In operation, sample molecules are introduced into source 12, ion source 12 ionizes the sample molecules, and packets of ionized molecules are launched down flight tube 16. A conventional orthogonal pulsing technique may be used to release the packets of ions into flight tube 16. The ions of each packet drift along a field-free region defined inside flight tube 16. As they drift down flight tube 16, the ions separate spatially in accordance with their respective masses, with the lighter ions acquiring higher velocities than the heavier ions. In FIG. 1, an ion packet 26 consists of two constituent ion concentrations: a relatively low concentration of lighter ions 28, and a relatively high concentration of heavier ions 30.

Figure 2A:
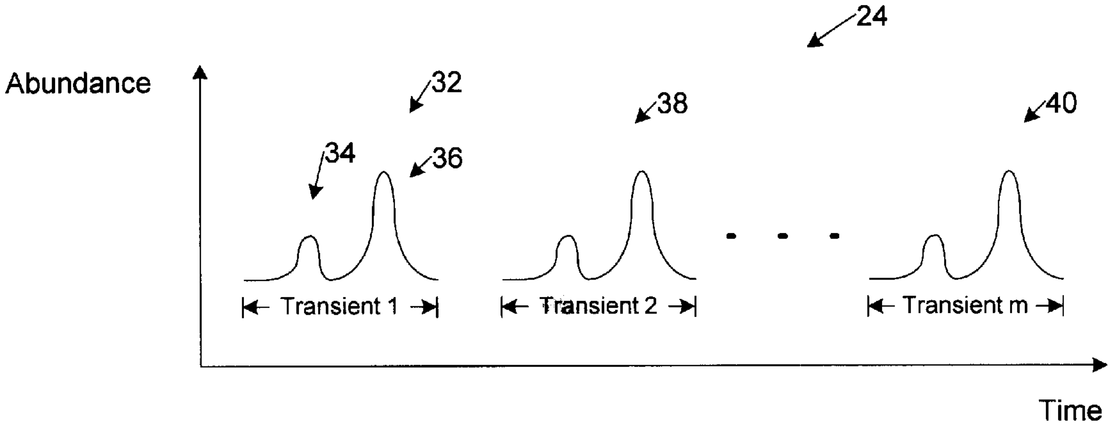
FIG. 2A is a plot of a transient sequence produced by an ion detector in the flight tube of FIG. 1.
Figure 2B:
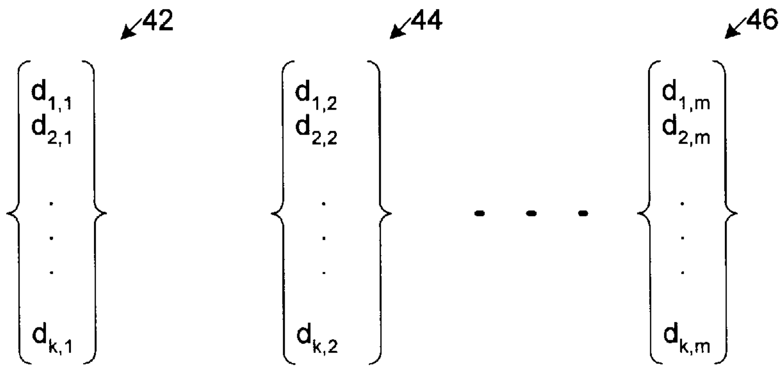
FIG. 2B is a diagrammatic view of a plurality of sets of data samples produced by the data acquisition system from transient sequence of FIG. 2A.
Figure 2C:
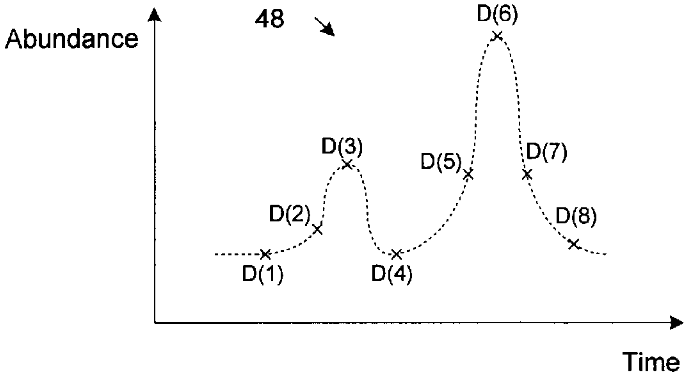
FIG. 2C is a plot of an accumulated sample spectrum produced by the data acquisition system from the data sample sets of FIG. 2B.
Figure 2D:
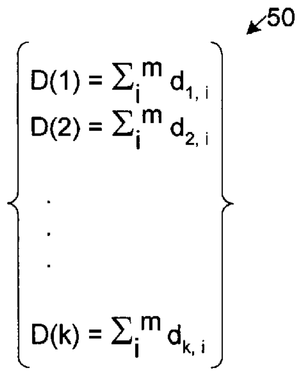
FIG. 2D is a diagrammatic view of an accumulated data sample set corresponding to the accumulated sample spectrum of FIG. 2C.

Referring to FIGS. 2A–2D, after an initial time delay corresponding to the time between the extraction pulse and the arrival of the first. (i.e., the lightest) ions at the detector, detector 22 produces a transient 32 representative of the ion intensities in the detected ion source extraction. The peaks 34, 36 of transient 32 represent the numbers of light ions 28 and heavy ions 30, respectively, and the peak times correspond to the mass-to-charge ratios of the ions within transient 32. Detector 22 produces a sequence of additional transients 38, 40 from subsequent ion packets launched into flight tube 16. Data acquisition system 18 samples m transients 32, 38, 40, and produces from each transient data samples ($d_{j.1}$, $d_{j.2}$, . . . , $d_{j.m}$, where j=1 to k) that may be represented as a respective data sample set 42, 44, 46 (FIG. 2B). The resulting data samples ($d_{j.1}$, $d_{j.2}$, . . . , $d_{j.m}$) are accumulated by data acquisition system 18 to produce a spectrum 48 (FIG. 2C), which may be represented by an accumulated data sample set 50 (FIG. 2D), in which each member corresponds to the sum of ion samples ($d_{j,i}$, where i=1 to m) having similar mass-to-charge ratios.

Data acquisition system 18 may be designed to control the operation of time-of-flight mass spectrometer 10, collect and process data signals received from detector 22, control the gain settings of the output of ion detector 22, and provide a set of time array data to processor 20. As explained in detail below, data acquisition system 18 is configured to accumulate corresponding data samples across the transient sequence 24 through each of a plurality of parallel data accumulation paths. In this way, data acquisition system 18 may accumulate data samples at a high speed, while reducing the impact of noise introduced by data acquisition system 18.

Figure 3:
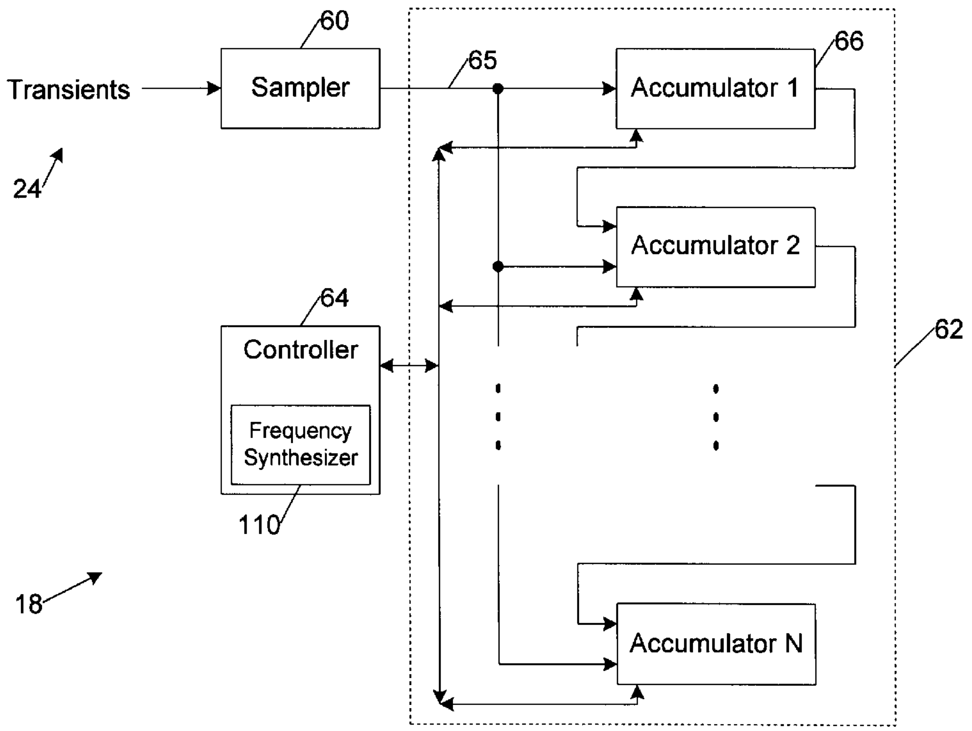
FIG. 3 is a block diagram of the data acquisition system of FIG. 1, including a plurality of accumulation paths each having a respective accumulator.

Referring to FIG. 3, in one embodiment, data acquisition system 18 includes a sampler 60 (e.g., a high speed flash analog-to-digital converters, a multipath sample accumulator 62 and a controller 64. Sampler 60 samples transients 24 and produces a series of data samples 65, which are applied to an input of sample accumulator 62. The output of sampler 60 is a series of digital signals (i.e., an n-bit word) each of which represents instantaneous ion intensities at respective sampling times. The resolution with which sampler 60 captures the instantaneous ion intensities is determined by the bit width of sampler 60. Sample accumulator 62 includes a plurality (N) of accumulators 66 that define a respective plurality of parallel data accumulation paths. In operation, controller 64 directs the data samples to one of the N accumulators 66 in sequence. Thus, each accumulator 66 processes only 1/N of the data samples and need only operate at a frequency that is roughly only 1/N of the operating frequency of a comparable single-path data acquisition system (e.g., the sampling rate). At the same time, controller 64 cycles the accumulation of data samples through each of the accumulation paths so that corresponding data samples across the transient sequence are accumulated through each of the accumulation paths. For example, assuming that eight data samples ($d_{1.i}$, $d_{2.i}$, . . . , $d_{8.i}$) are measured for each transient 24, the data samples would be accumulated after each of m transients as follows:

TABLE 1

Cycled Transient Accumulation

| | After Signal 1 | After Signal 2 | After Signal 3 | . . . | After Signal m |
|---|---|---|---|---|---|
| Accumulator 1 | $d_{1.1}$ | $d_{8.1} + d_{8.2}$ | $d_{7.1} + d_{7.2} + d_{7.3}$ | . . . | $d_{1.1} + \ldots + d_{1.m}$ |
| Accumulator 2 | $d_{2.1}$ | $d_{1.1} + d_{1.2}$ | $d_{8.1} + d_{8.2} + d_{8.3}$ | . . . | $d_{2.1} + \ldots + d_{2.m}$ |
| Accumulator 3 | $d_{3.1}$ | $d_{2.1} + d_{2.2}$ | $d_{1.1} + d_{1.2} + d_{1.3}$ | . . . | $d_{3.1} + \ldots + d_{3.m}$ |
| Accumulator 4 | $d_{4.1}$ | $d_{3.1} + d_{3.2}$ | $d_{2.1} + d_{2.2} + d_{2.3}$ | . . . | $d_{4.1} + \ldots + d_{4.m}$ |
| Accumulator 5 | $d_{5.1}$ | $d_{4.1} + d_{4.2}$ | $d_{3.1} + d_{3.2} + d_{3.3}$ | . . . | $d_{5.1} + \ldots + d_{5.m}$ |
| Accumulator 6 | $d_{6.1}$ | $d_{5.1} + d_{5.2}$ | $d_{4.1} + d_{4.2} + d_{4.3}$ | . . . | $d_{6.1} + \ldots + d_{6.m}$ |
| Accumulator 7 | $d_{7.1}$ | $d_{6.1} + d_{6.2}$ | $d_{5.1} + d_{5.2} + d_{5.3}$ | . . . | $d_{7.1} + \ldots + d_{7.m}$ |
| Accumulator 8 | $d_{8.1}$ | $d_{7.1} + d_{7.2}$ | $d_{6.1} + d_{6.2} + d_{6.3}$ | . . . | $d_{8.1} + \ldots + d_{8.m}$ |

As explained in detail below, each accumulation path induces a unique noise signal in each of the transients 24. By cycling the accumulation of data samples through each of the N accumulation paths, data acquisition system 18 reduces the noise level in the accumulated spectrum 48 relative to a system that does not perform such cycling. In particular, the accumulated spectrum may be expressed as:

$$D(h)=\Sigma^{m}_{j=1}d(h,\ j) \tag{1}$$

where d(h, j) is the $j^{th}$ accumulated data point having a mass-to-charge ratio of h. The component data samples of the accumulated data points (d(h, j)) may be expressed as follows:

$$d(h,\ j)=s(h,\ j)+v(h,\ j)+n(h,\ j) \tag{2}$$

where s(h, j) is the noise-free signal, v(h, j) is the signature (or pattern) noise induced by the paths of the data acquisition system, and n(h, j) is random noise. The induced signature noise (v(h, j)) is a non-random, non-white noise source that is specific to each accumulation path. In a dual-path data accumulation embodiment, all of the even-numbered samples have the same induced digital noise (i.e., v(2, j)=v(4, j)), and all of the odd-numbered samples have the same induced digital noise (i.e., v(1, j)=v(3, j)). Similarly, for a four-path data accumulation embodiment, v(1, j)=v(5, j), v(2, j)=v(6, j), v(3, j)=v(7, j), and v(4, j)=v(8, j).

Without path cycling, the induced signature noise is the same across the data samples (i.e., v(h, 1)=v(h, 2)= . . . =v(h, m)). As a result, the accumulated spectrum signal may be estimated by the following equation:

$$D(h)=m\cdot s(h)+m\cdot v(h)+\Sigma^{m}_{j=1}n(h,\ j) \tag{3}$$

The random noise source (n(h, j)) falls off by the square root of m and, therefore, becomes negligible for large values of m. The induced signature noise (v(h)), however, increases because it is specific to each an accumulation channel and not random. Thus, in a dual-path data accumulation system, $$D(\mathbf{1})=m\cdot s(\mathbf{1})+m\cdot v(\mathbf{1}) \tag{4}$$

$$D(\mathbf{2})=m\cdot s(\mathbf{2})+m\cdot v(\mathbf{2}) \tag{5}$$

For large transient signals, the s(h) term dominates the v(h) and, consequently, the data acquisition system may resolve the data signal. For small transient signals, however, the v(h) term may be larger than the s(h) term, making it difficult to resolve the data signal. In particular, for small transient signals, the difference between data points in the accumulated spectrum may be estimated as follows:

$$D(\mathbf{2})-D(\mathbf{1})=m\cdot v(\mathbf{2})-m\cdot v(\mathbf{1}) \tag{6}$$

Figure 6:
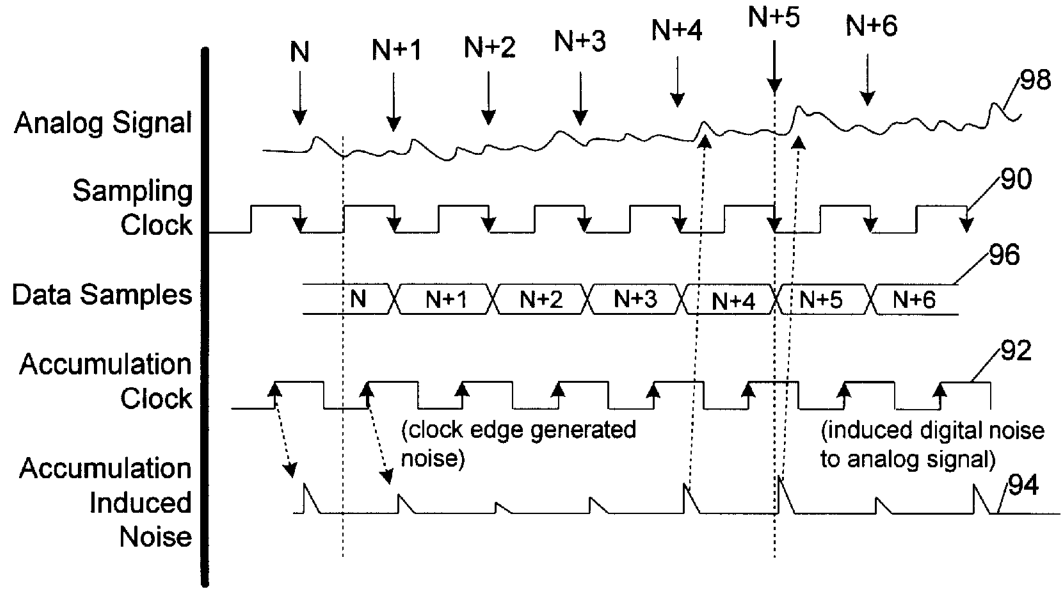
FIG. 6 is a plot of signals of a mass spectrometer having a single-path accumulator that is clocked by an accumulation clock that is shifted in phase relative to a sampling clock.

This difference is the cause of the induced pattern noise signal 94 shown in FIG. 6.

On the other hand, if the sample accumulation is cycled through each of the N accumulation paths as described above, the induced digital noise signatures may be reduced substantially or eliminated as follows. In a dual-path data accumulation embodiment the following relationships are established (ignoring random noise). The data samples for the first transient may be expressed as follows:

$$d(\mathbf{1},\ \mathbf{1})=s(\mathbf{1},\ \mathbf{1})+v(\mathbf{1},\ \mathbf{1}) \tag{7}$$

$$d(\mathbf{2},\ \mathbf{1})=s(\mathbf{2},\ \mathbf{1})+v(\mathbf{2},\ \mathbf{1}) \tag{8}$$

$$d(\mathbf{3},\ \mathbf{1})=s(\mathbf{3},\ \mathbf{1})+v(\mathbf{1},\ \mathbf{1}) \tag{9}$$

$$d(\mathbf{4},\ \mathbf{1})=s(\mathbf{4},\ \mathbf{1})+v(\mathbf{2},\ \mathbf{1}) \tag{10}$$

where v(1, 1)=v(3, 1) and v(2, 1)=v(4, 1) in a dual-path data accumulation system. The data samples for the second transient may be expressed as follows:

$$d(1, 2)=s(1, 2)+v(2, 2) \quad (11)$$

$$d(2, 2)=s(2, 2)+v(1, 2) \quad (12)$$

$$d(3, 2)=s(3, 2)+v(2, 2) \quad (13)$$

$$d(4, 2)=s(4, 2)+v(1, 2) \quad (14)$$

Since the induced digital signature noise (v(h, j) is the same for all transients (i.e., v(1, 1)=v(1, 2) and v(2, 1)=v(2, 2)), equations (11)–(14) may be re-written as follows:

$$d(1, 2)=s(1, 2)+v(2, 1) \quad (15)$$

$$d(2, 2)=s(2, 2)+v(1, 1) \quad (16)$$

$$d(3, 2)=s(3, 2)+v(2, 1) \quad (17)$$

$$d(4, 2)=s(4, 2)+v(2, 1) \quad (18)$$

Thus, the summation of the data points for the first two transients may be expressed as follows:

$$D(1)=s(1, 1)+s(1, 2)+[v(1, 1)+v(2, 1)] \quad (19)$$

$$D(2)=s(2, 1)+s(2, 2)+[v(2, 1)+v(1, 1)] \quad (20)$$

$$D(3)=s(3, 1)+s(3, 2)+[v(1, 1)+v(2, 1)] \quad (21)$$

$$D(4)=s(4, 1)+s(4, 2)+[v(2, 1)+v(1, 1)] \quad (22)$$

As a result, the induced digital signature noise terms drop out in the difference between any two adjacent data points. For example, the difference between the first accumulated data point (D(1)) and the second accumulated data point (D(2)) may be expressed as follows:

$$D(2)-D(1)=[s(2, 1)+s(2, 2)]-[s(1, 1)+s(1, 2)] \quad (23)$$

In general, the difference between any two adjacent data points may be expressed as follows:

$$D(h)-D(h-1)=\Sigma_j\ [s(h, j)+s(h-1, j)]+\Sigma^m_{j-1}\ [n(h, j)+n(h-1, j)] \quad (24)$$

The only noise term remaining in equation (24) is the random noise source (n(h, j)), which drops off by the square root of the number of summations (m). In this case, equation (3) reduces to the following form:

$$D(h)=m\cdot s(h)+\Sigma^m_{j-1},\ n(h, j) \quad (25)$$

This feature of the data acquisition system advantageously improves the signal-to-noise ratio of the accumulated spectrum 48 and, ultimately, improves the sensitivity of the measurements of mass spectrometer 10.

Figure 4:
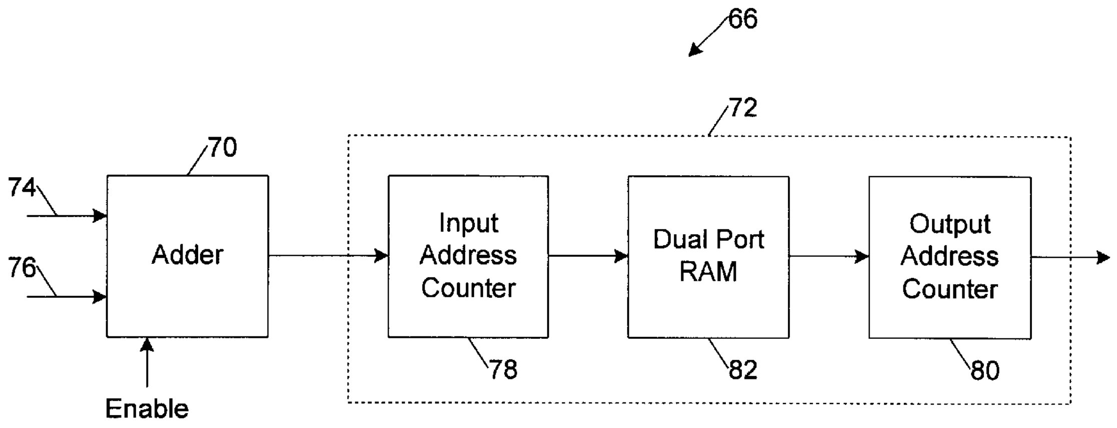
FIG. 4. is a block diagram of an accumulator of the data acquisition system of FIG. 3.

Referring to FIG. 4, in one embodiment, each accumulator 66 includes an adder 70 and a memory system 72. In operation, during each clock cycle adder 70 computes the sum of the signal values applied to inputs 74, 76, and memory system 72 stores the computed sum. As shown in FIG. 4, memory system 72 may include an input address counter 78, an output address counter 80 and a dual port random access memory (RAM) 82. In one embodiment, controller 64 selectively enables adder 70 so that corresponding data samples generated by sampler 60 are accumulated through each of the data accumulation paths. In another embodiment, controller 64 selectively directs data samples to respective accumulation paths, for example, by controlling the output of a 1-by-N multiplexer, which is coupled between sampler 60 and sample accumulator 62.

Other embodiments are within the scope of the claims.

Figure 5:
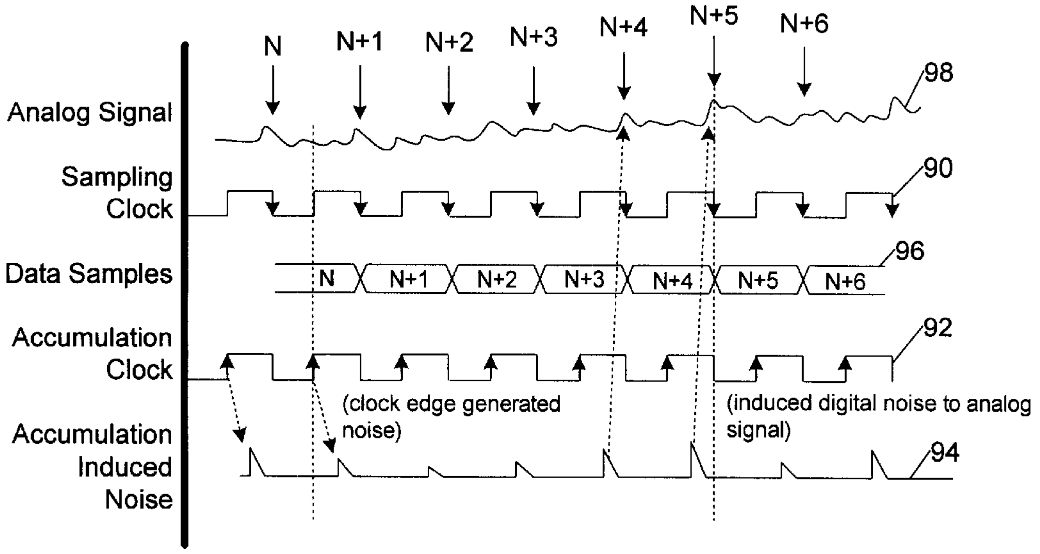
FIG. 5 is a plot of signals of a mass spectrometer having a single-path accumulator that is clocked by an accumulation clock that is synchronized with a sampling clock.

Referring to FIG. 5, in a single accumulation path embodiment, sampler 60 is configured to sample transients 24 received from ion detector 22 in response to the falling edge of a sampling clock 90. Sample accumulator 62, on the other hand, is configured to accumulate data in response to the rising edge of an accumulation clock 92. If sampling clock 90 and accumulation clock 92 are in phase (as shown), the rising edge of accumulation clock 92 may induce a noise signal 94 in an analog transient 98. The induced noise ultimately may appear in data samples 96 produced by sampler 60, reducing the signal-to-noise ratio and reducing the sensitivity of the accumulated spectrum 48. Without being limited to a particular theory, it is believed that this noise is generated, at least in part, by a capacitive coupling between sample accumulator 62 and sampler 60.

The magnitude of the accumulation clock induced noise signal 94 may be reduced substantially by shifting the phase of accumulation clock 92 relative to sampling clock 90. For example, referring to FIG. 6, by shifting accumulation clock 92 relative to sampling clock 90, the noise signal peaks 99, which are induced in transient 98, may be shifted away from the sampling times (i.e., the falling edges of sampling clock 90) to reduce the noise level appearing in accumulated spectrum 48. Accumulation clock 92 preferably is shifted relative to sampling clock 90 by an amount selected to minimize induced noise signal 94. In one embodiment, accumulation clock 92 preferably is shifted between 90° and 270° relative to sampling clock 90, and more preferably is shifted approximately 180° relative to sampling clock 90.

Figure 7:
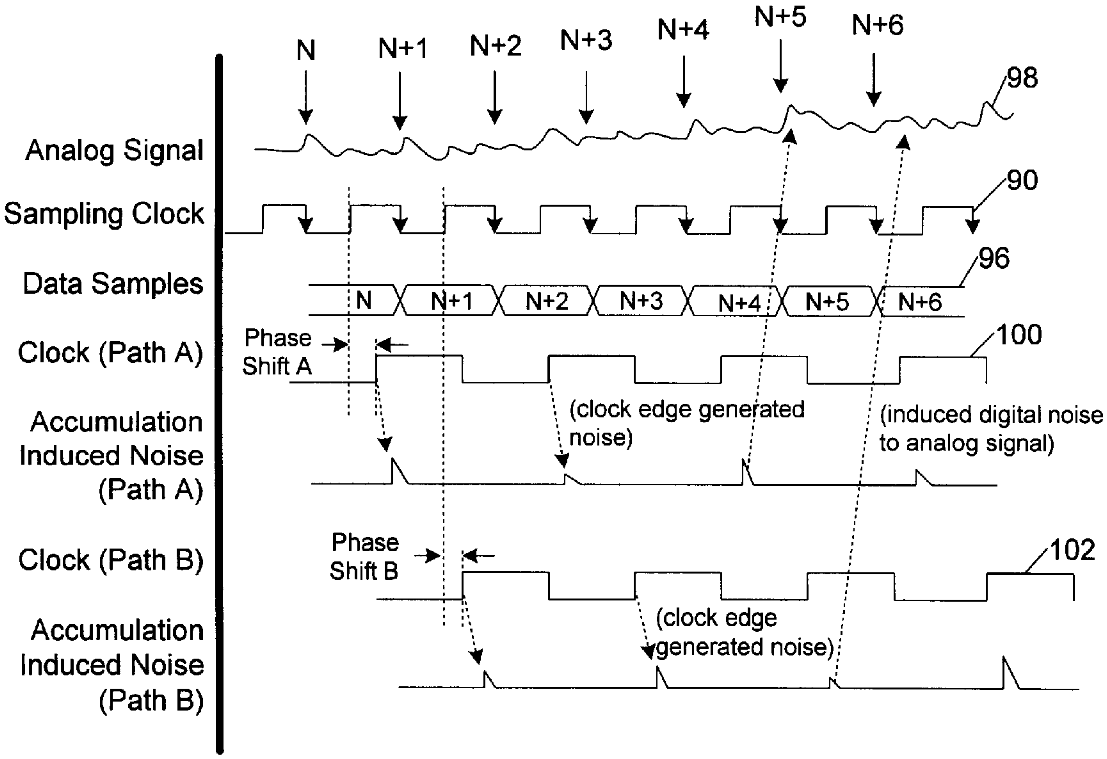
FIG. 7 is a plot of signals of a mass spectrometer having a accumulator with multiple accumulation paths, each of which is clocked by a respective accumulation clock that is shifted in phase relative to a sampling clock by a respective amount.

Referring to FIG. 7, in another embodiment, sample accumulator 62 includes two accumulation paths (Path A and Path B), each of which accumulates data samples in response to a respective accumulation clock 100, 102. In this embodiment, the phase of each accumulation clock 100, 102 is shifted relative to sampling clock 90 by a respective amount selected to reduce the overall noise in the accumulated spectrum 48. The phases of accumulation clocks 100, 102 may be shifted by the same amount relative to sampling clock 90, or they may be shifted independently by different amounts (as shown).

The above-described phase shift between sampling clock 90 and the one or more accumulation clocks may be implemented by a multiphase frequency synthesizer 110 (FIG. 3) that includes a phase-locked loop, a delay-locked loop, or any phase-shifting clock driver. In addition, the phase shift between sampling clock 90 and the one or more accumulation clocks may be programmable to enable the relative clock phases to be adjusted during an initial calibration of mass spectrometer 10 or dynamically during operation of mass spectrometer 10.

The systems and methods described herein are not limited to any particular hardware or software configuration, but rather they may be implemented in any computing or processing environment. Data acquisition controller 64 preferably is implemented in hardware or firmware. Alternatively, controller 64 may be implemented in a high level procedural or object oriented programming language, or in assembly or machine language; in any case, the programming language may be a compiled or interpreted language.

Still other embodiments are within the scope of the claims.

What is claimed is:

1. A data acquisition system, comprising:

a sampler configured to produce a plurality of data samples from a transient sequence in response to a sampling clock; and an accumulator coupled to the sampler and configured to accumulate data samples in response to an accumulation clock that is shifted in phase relative to the sampling clock.

2. The data acquisition system of claim 1, wherein the accumulator is configured to accumulate corresponding data samples across the transient sequence.

3. The data acquisition system of claim 1, wherein the accumulation clock is shifted between 90° and 270° relative to the sampling clock.

4. The data acquisition system of claim 3, wherein the accumulation clock is shifted approximately 180° relative to the sampling clock.

5. The data acquisition system of claim 1, further comprising a multiphase frequency synthesizer configured to generate the sampling clock and the accumulation clock.

6. The data acquisition system of claim 1, wherein the accumulator comprises two or more parallel accumulation paths and accumulates corresponding data samples across the transient sequence through different accumulation paths.

7. The data acquisition system of claim 6, wherein each accumulation path accumulates data samples in response to a respective accumulation clock.

8. The data acquisition system of claim 7, wherein the phase of the accumulation clock for each accumulation path is shifted relative to the sampling clock by a respective amount.

9. The data acquisition system of claim 6, further comprising a controller coupled to the accumulator and configured to cycle the accumulation of data samples through each of the accumulation paths.

10. A time-of-flight mass spectrometer, comprising:

an ion detector configured to produce a transient sequence from a plurality of respective ion packets;

a sampler configured to produce a plurality of data samples from the transient sequence in response to a sampling clock; and an accumulator coupled to the sampler and configured to accumulate corresponding data samples across the transient sequence in response to an accumulation clock that is shifted in phase relative to the sampling clock.

11. The data acquisition system of claim 10, further comprising a multiphase frequency synthesizer configured to generate the sampling clock and the accumulation clock.

12. The mass spectrometer of claim 10, wherein the accumulator comprises two or more accumulation paths and accumulates corresponding data samples across the transient sequence through different accumulation paths.

13. The data acquisition system of claim 12, wherein each accumulation path accumulates data samples in response to a respective accumulation clock that is shifted relative to the sampling clock by a respective amount.

14. The mass spectrometer of claim 12, further comprising a controller coupled to the accumulator and configured to cycle the accumulation of data samples through each of the accumulation paths.

15. A method of acquiring data, comprising:

producing a plurality of data samples from a transient sequence in response to sampling clock; and accumulating corresponding data samples across the transient sequence in response to an accumulation clock that is shifted in phase relative to the sampling clock.

16. The method of claim 15, further comprising shifting the phase of the accumulation clock relative to the sampling clock by an amount selected to reduce noise in an accumulator output signal.

17. The method of claim 15, wherein corresponding data samples are accumulated across the transient sequence through two or more parallel accumulation paths.

18. The method of claim 17, wherein data samples are accumulated through each accumulation path in response to a respective accumulation clock.

19. The method of claim 18, further comprising shifting the phase of each accumulation path clock to reduce noise in the accumulated data samples.

20. The method of claim 17, further comprising cycling the accumulation of data samples through each of the parallel accumulation paths.

* * * * *